US008145838B1

(12) United States Patent
Miller et al.

(10) Patent No.: US 8,145,838 B1
(45) Date of Patent: Mar. 27, 2012

(54) PROCESSING AND DISTRIBUTING WRITE LOGS OF NODES OF A CLUSTER STORAGE SYSTEM

(75) Inventors: Steven C Miller, Livermore, CA (US); Peter F. Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 334 days.

(21) Appl. No.: 12/401,533

(22) Filed: Mar. 10, 2009

(51) Int. Cl.
*G06F 12/00* (2006.01)

(52) U.S. Cl. .......................... 711/114; 711/161
(58) Field of Classification Search .................. 711/114
See application file for complete search history.

(56) References Cited

U.S. PATENT DOCUMENTS

| | | | |
|---|---|---|---|
| 7,330,996 | B2 | 2/2008 | Coteus et al. |
| 7,392,302 | B2 | 6/2008 | Halpern |
| 7,487,390 | B2 | 2/2009 | Saika |
| 7,502,954 | B1 | 3/2009 | Strickland et al. |
| 7,523,341 | B2 | 4/2009 | Hufferd et al. |
| 7,613,947 | B1 | 11/2009 | Coatney et al. |
| 7,657,786 | B2 | 2/2010 | Takuwa et al. |
| 7,702,947 | B2 | 4/2010 | Peddada |
| 7,734,947 | B1 | 6/2010 | Frangioso et al. |
| 2002/0049925 | A1 | 4/2002 | Galipeau et al. |
| 2002/0116593 | A1 | 8/2002 | Kazar et al. |
| 2002/0194390 | A1 | 12/2002 | Elving |
| 2003/0135782 | A1 | 7/2003 | Matsunami et al. |
| 2004/0181707 | A1 | 9/2004 | Fujibayashi |
| 2005/0138517 | A1 | 6/2005 | Monitzer |
| 2005/0228834 | A1 | 10/2005 | Shinkai |
| 2006/0036896 | A1 | 2/2006 | Gamache et al. |
| 2006/0050629 | A1 | 3/2006 | Saika |
| 2006/0101033 | A1 | 5/2006 | Hu et al. |
| 2006/0117212 | A1 | 6/2006 | Meyer et al. |
| 2006/0218362 | A1 | 9/2006 | McManis |
| 2007/0113032 | A1* | 5/2007 | Kameyama et al. .......... 711/162 |
| 2007/0220323 | A1 | 9/2007 | Nagata |
| 2008/0126372 | A1* | 5/2008 | Holt .............................. 707/100 |
| 2009/0024868 | A1 | 1/2009 | Joshi et al. |
| 2009/0063668 | A1 | 3/2009 | Bish et al. |
| 2010/0232288 | A1 | 9/2010 | Coatney et al. |
| 2011/0078490 | A1 | 3/2011 | He et al. |

OTHER PUBLICATIONS

Aggregate. (2001). In Chambers 21st Century Dictionary. Retrieved from http://www.credoreference.com/entry/chambdict/aggregate.*
U.S. Appl. No. 12/401,458, filed Mar. 10, 2009, Coatney.
U.S. Appl. No. 11/606,727, filed Nov. 30, 2006, Coatney, et al.
U.S. Appl. No. 12/432,404, filed Apr. 29, 2009, Thomas Rudolf Wenzel.
U.S. Appl. No. 12/401,458, filed Mar. 10, 2009, Coatney et al.
U.S. Appl. No. 12/432,404, filed Apr. 29, 2009, Wenzel.
Schmuck et al. "GPFS: A shared-disk file system for large computing clusters", In Proceedings of the Conference on File and Storage Technologies (FAST), pp. 231-244, USENIX Association, Jan. 2002.
U.S. Appl. No. 12/401,458, filed Mar. 10, 2009, Coatney.

* cited by examiner

*Primary Examiner* — Sanjiv Shah
*Assistant Examiner* — Daniel Tsui
(74) *Attorney, Agent, or Firm* — Stattler-Suh PC

(57) ABSTRACT

A cluster storage system comprises a plurality of nodes that access a shared storage, each node having two or more failover partner nodes. A primary node produces write logs for received write requests and produces parity data for the write logs (storing the parity data to local non-volatile storage). By storing parity data rather than actual write logs, the non-volatile storage space within the cluster for storing write logs is reduced. Prior to failure of the primary node, the primary node also sub-divides the write logs into two or more sub-sets and distributes the sub-sets to the two or more partner nodes for storage at non-volatile storage devices. Thus, if the primary node fails, its write logs are already distributed among the partner nodes so each partner node may perform the allotted write logs on the storage, thus improving the response time to the primary node failure.

16 Claims, 9 Drawing Sheets

PROCESSING AND DISTRIBUTING WRITE LOGS OF NODES OF A CLUSTER STORAGE SYSTEM

RELATED APPLICATIONS

This application is related to U.S. patent application Ser. No. 12/401,458, entitled "Takeover of a Failed Node of a Cluster Storage System on a Per Aggregate Basis," by Susan M. Coatney, et al., filed herewith, and incorporated herein by reference.

FIELD OF THE INVENTION

The present invention relates to storage systems, and particularly, to processing and distributing write logs of nodes of a cluster storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units (LUs). For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from NetApp, Inc. Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (read/write requests) as file-based and block-based protocol messages (in the form of packets) to the system over the network.

A plurality of storage systems may be interconnected to provide a storage system architecture configured to service many clients. In some embodiments, the storage system architecture provides one or more aggregates and one or more volumes distributed across a plurality of nodes interconnected as a cluster. The aggregates may be configured to contain one or more volumes. The volumes may be configured to store content of data containers, such as files and logical units, served by the cluster in response to multi-protocol data access requests issued by clients.

Each node of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each node is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The nodes of the cluster may be configured to communicate with one another to act collectively to increase performance or to offset any single node failure within the cluster. Each node in the cluster may have a predetermined failover "partner" node. When a node failure occurs (where the failed node is no longer capable of processing access requests for clients), the access requests sent to the failed node may be re-directed to the partner node for processing. As such, the cluster may be configured such that a partner node may take over the work load of a failed node. A node may be referred to as a local/primary node when referring to a current node being discussed, whereas a remote/partner node refers to a predetermined failover partner node of the local/primary node. As used herein, various components residing on the primary node may likewise be referred to as a local/primary component (e.g., local memory, local de-staging layer, etc.) and various components residing on a remote node may likewise be referred to as a remote component (e.g., remote memory, remote de-staging layer, etc.).

A cluster provides data-access service to clients by providing access to shared storage (comprising a set of storage devices). Typically, clients will connect with a node of the cluster for data-access sessions with the node. During a data-access session with a node, a client may submit access requests (read/write requests) that are received and performed by the node. For the received write requests, the node may produce write logs that represent the write requests and locally store the write logs to a volatile memory device (from which, the node may at a later time perform the write logs on the storage devices). To ensure data consistency, the write logs may also be stored to two non-volatile storage devices.

Typically, the write logs of the node may be locally stored to a non-volatile memory device and also be stored remotely to a non-volatile storage device at the partner node. As such, if the local/primary node fails, the remote/partner node will have a copy of the write logs and will still be able to perform the write logs on the storage devices. Also, if the write logs stored at the partner node is corrupted or lost, the write logs stored locally in the non-volatile storage device at the primary node can be extracted/retrieved and used to perform the write logs on the storage devices.

If the write logs of one node has a storage size equal to "logspace," the non-volatile storage space, within the cluster, required to store the write logs of one node is equal to 2*logspace (where the write logs are stored locally on the primary node and also stored remotely on the partner node). As such, all write logs are stored to a first non-volatile storage device and a full duplicate of the write logs are stored to a second non-volatile storage device (referred to herein as a "mirroring" method). Thus, within the cluster, the non-volatile storage space required to store write logs of all nodes of the cluster is equal to 2n*logspace, where n is equal to the number of nodes in the cluster. As such, conventional mirroring methods for storing write logs may consume a significant amount of valuable non-volatile storage space within the cluster.

SUMMARY OF THE INVENTION

In some embodiments, a cluster storage system comprises a plurality of nodes that access a set of storage devices, each node having two or more predetermined failover partner nodes. In these embodiments, a primary node receives write requests and produces write logs that represent the received write requests. The primary node may produce parity data for the write logs and store the parity data locally to a non-volatile storage device. By storing locally only the parity data of the write logs (rather than storing the actual write logs), the non-volatile storage space within the cluster used for storing write logs may be reduced. Also, copies of the write logs of the primary node may be striped/sub-divided and distributed remotely (prior to failure of the primary node) to two or more partner nodes for storage at non-volatile storage devices. Thus, prior to failure of the primary node, the write logs of the primary node will already be distributed among two or more partner nodes so that each partner node will already have stored locally a sub-set of the write logs to perform on the storage devices. As such, the write logs do not need to be distributed to the two or more partner nodes after failure of the primary node, which improves the response time of the cluster to the failure of the primary node.

In some embodiments, each node may perform write requests in two stages. In a first stage, a primary node may receive write requests (containing blocks of data to be written) and produce a write log for each received write request, a write log representing a write request and containing the blocks of data to be written. The write logs of the primary node may be stored to a local volatile memory device. In a second stage, upon occurrence of a predetermined initiating event (referred to as a "consistency point"), accumulated write logs stored in the local volatile memory device may be performed on the storage devices (whereby the received blocks of data are written to the storage devices). In some embodiments, each write log may be implemented as a pair of buffers, whereby one buffer is allowed to be filled while the other buffer is held during the consistency point.

In some embodiments, after the first stage and prior to the second stage, the primary node may produce parity data for one or more write logs stored locally in volatile memory (e.g., RAM). The primary node may do so using any parity scheme known in the art, e.g., single parity, double parity, etc. The primary node may then store the parity data locally to a non-volatile storage device (e.g., NVRAM). By storing only the parity data of the write logs to the non-volatile storage device (rather than a full copy of the write logs as done in the mirroring method), the storage space used for storing the write logs may be reduced throughout the cluster.

In some embodiments, the write logs of the primary node (stored locally in volatile memory) may also be stored remotely at two or more partner nodes to non-volatile storage devices. In these embodiments, each primary node of a cluster has two or more failover partner nodes that are configured to take over the workload of the primary node if the primary node fails. As opposed to each primary node having only a single partner node where the entire additional workload (of the failed primary node) is imposed on a single partner node, the additional workload may thus be distributed among two or more partner nodes.

The cluster may be configured such that each primary node may locally store its own write logs and a copy of the write logs stored remotely to only one of the partner nodes. Upon failure of the primary node, the partner node storing the copy of the write logs may sub-divide and distribute the write logs to the other partner nodes of the primary node, whereby each partner node then performs its allotted write logs on the storage devices. However, since the partner node storing the write logs sub-divides and distributes the write logs to the other partner nodes after failure of the primary node, this method increases the response time of the cluster to the failure of the primary node.

In some embodiments, the write logs of the primary node may be striped/sub-divided and distributed to each of its two or more partner nodes prior to failure of the primary node (e.g., upon the write logs being produced by the primary node) for storage at a non-volatile storage device. As such, upon failure of the primary node, each partner node will already have stored locally a sub-set of its allotted write logs to perform on the storage devices. This avoids having a single partner node sub-divide and re-distribute the write logs to the other partner nodes after failure of the primary node, which improves the response time of the cluster to the failure of the primary node. Also, if the data of the write logs stored at a particular partner node is corrupted or lost, the corrupted or lost write log data can be reconstructed from the parity data stored at the primary node and the write log data stored at the one or more other partner nodes not having corrupted or lost write log data. The particular partner node may then perform the reconstructed write logs on the storage devices.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into four sections. Section I describes a cluster environment in which some embodiments operate. Section II describes a storage operating system having a de-staging layer for processing and distributing write logs. Section III describes a shared storage of the cluster. Section IV describes processing and distributing write logs of nodes of a cluster.

I. Cluster Environment

Figure 1A:
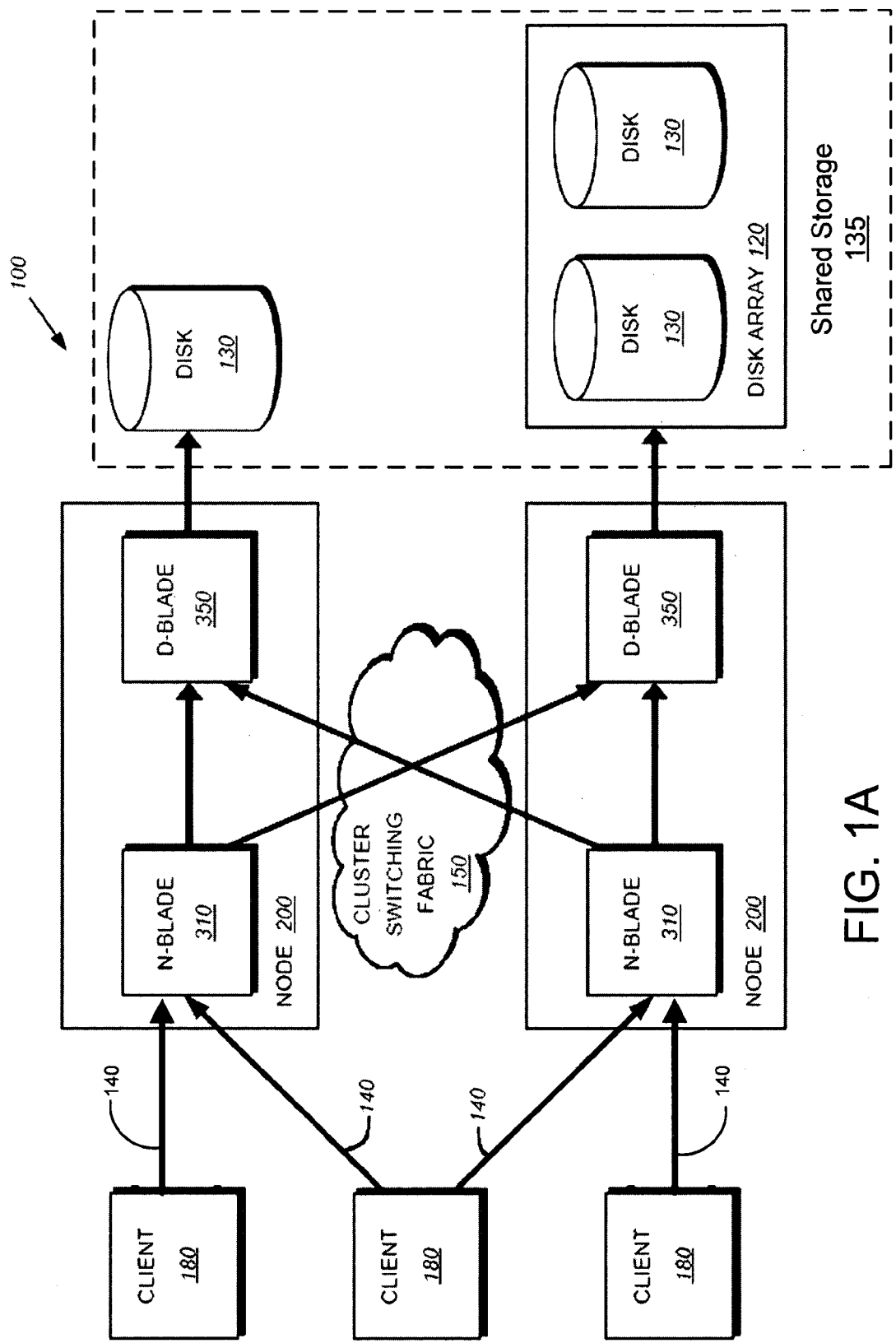
FIGS. 1A-B are schematic block diagrams of an exemplary cluster environment in which some embodiments operate.
Figure 1B:
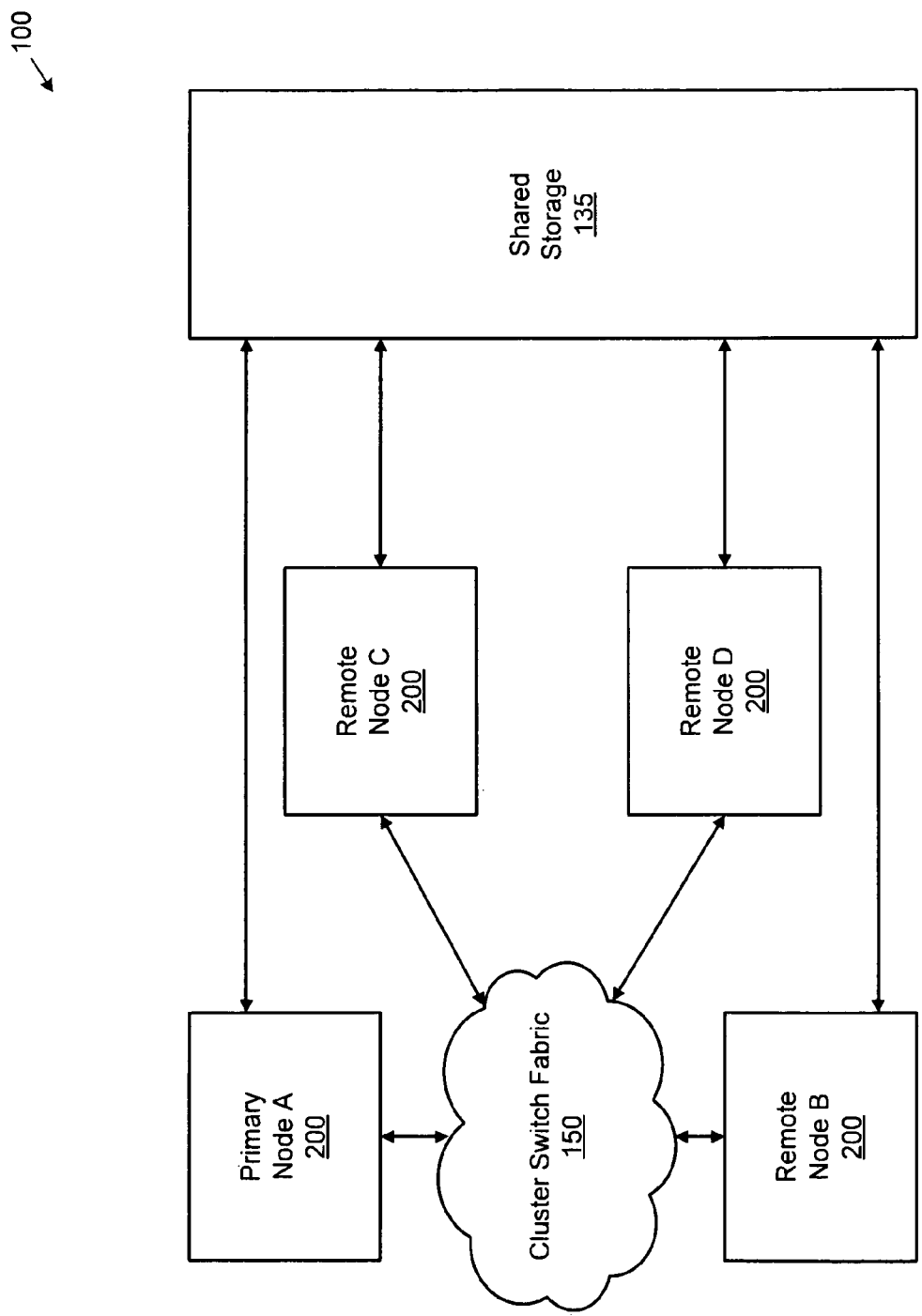

FIGS. 1A-B are schematic block diagrams of an exemplary cluster 100 environment in which some embodiments operate. A cluster 100 may comprise a plurality of interconnected nodes 200 configured to provide storage services for a set of storage devices. The nodes 200 comprise various functional components that cooperate to provide a distributed storage system architecture of the cluster 100.

As shown in FIG. 1A, each node 200 may be organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. In other embodiments, the cluster switching fabric 150 may be embodied as another clustering network connection. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002.

It should be noted that although disks 130 are used in some embodiments described below, any other type of storage device may be used as well. For example, a solid state storage device may be used instead, the solid state device having no mechanical moving parts for reading and writing data. Some examples of solid state devices include flash memory, non-volatile random access memory (NVRAM), Magnetic Random Access Memory (MRAM), Phase Change RAM (PRAM), etc. In other embodiments, other storage devices other than those mentioned here may also be used.

Also, it should be noted that while there is shown an equal number of N and D-blades in the illustrative cluster 100, there may be differing numbers of N and/or D-blades, and/or different types of blades implemented in the cluster 100 in accordance with various embodiments. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only. For example, a node 200 may also have one N-blade and a plurality of D-blades, a plurality of N-blades and one D-blade, or a plurality of N-blades and a plurality of D-blades.

The clients 180 may be general-purpose computers configured to interact with the node 200 in accordance with a client/server model of information delivery. That is, each client 180 may request the services of the node 200 (e.g., by submitting read/write requests), and the node 200 may return the results of the services requested by the client 180, by exchanging packets over the network 140. The client 180 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, a client 180 connects to a node 200 for a data-access session with the node 200. During a data-access session, the client 180 may submit access requests that are received and performed by the node 200. Such access requests may include storage state requests, a storage state request comprising a request that alters the data state of a storage device 130. Examples of storage state requests include requests for storing new data to a file, deleting a file, changing attributes of a file, etc. For illustrative purposes, storage state requests may be generically referred to herein as write requests.

In some embodiments, the totality of storage space provided by the disks 130 and disk arrays 120 of the cluster 100 comprise a total shared storage space (referred to as "shared storage 135") of the cluster 100. In other embodiments, the shared storage 135 comprises the totality of storage space provided by other types of storage devices (such as solid state storage devices). The shared storage 135 is accessible by each D-blade 350 of each node 200 in the cluster 100. The shared storage 135 is discussed in detail in Section III. In some embodiments, the cluster 100 may provide high availability of service to clients 180 in accessing the shared storage 135. For example, the nodes 200 may be configured to communicate with one another (e.g., via cluster switching fabric 150) to act collectively to offset any single node 200 failure within the cluster 100.

FIG. 1B shows an embodiment where each node 200 may have two or more predetermined failover "partner" nodes 200. Each node is configured for providing data-access service to clients connected with the node. When a node 200 failure occurs (where the failed node is no longer capable of processing access requests for clients 180), the two or more partner nodes 200 are configured to automatically resume/take over the data-access service functions provided by the failed node 200. As such, when a node failure occurs, access requests sent to the failed node 200 may be re-directed to the two or more partner nodes 200 for processing and execution. Note that a node 200 failure may occur unintentionally or intentionally (e.g., where a node is taken offline for servicing).

As opposed to each node 200 having only a single partner node 200 where the entire additional workload (of the failed node) is imposed on a single partner node, the additional workload may thus be distributed among two or more partner nodes. A cluster 100 wherein a node 200 may have two or more predetermined failover partner nodes 200 may be referred to herein as an "N-way system." N-way systems are discussed in detail in U.S. patent application Ser. No. 12/401,458, entitled "Takeover of a Failed Node of a Cluster Storage System on a Per Aggregate Basis," by Susan M. Coatney, et al., filed herewith, and incorporated herein by reference.

Figure 2:
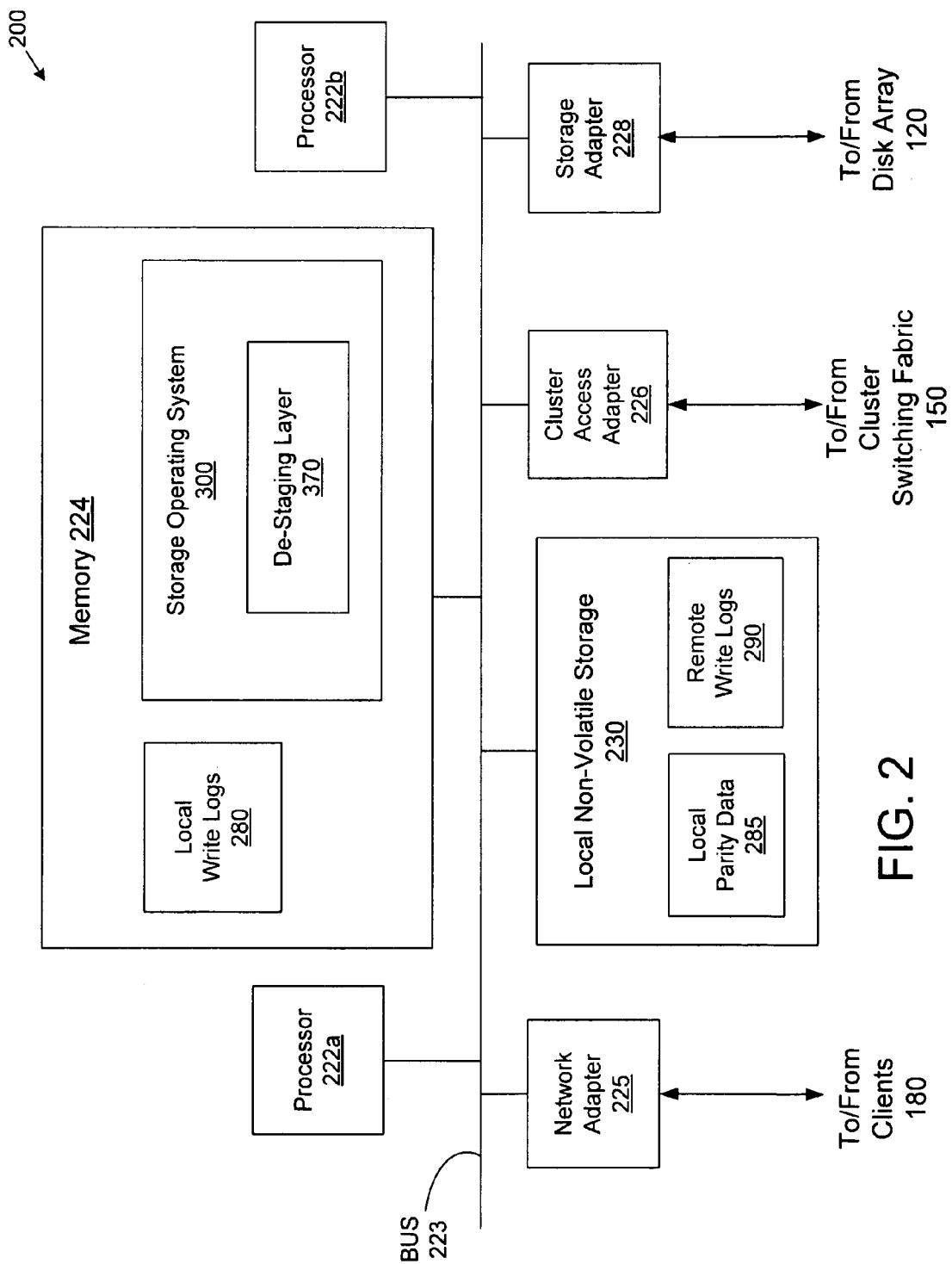
FIG. 2 is a schematic block diagram of an exemplary node that may be employed in the cluster environment.

FIG. 2 is a schematic block diagram of an exemplary node 200 that may be employed in the cluster environment of FIGS. 1A-B. A node 200 may be illustratively embodied as a storage system comprising a plurality of processors 222a,b, a memory 224, a network adapter 225, a cluster access adapter 226, a storage adapter 228 and local non-volatile storage device 230 interconnected by a system bus 223.

The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node 200 over the network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

The memory 224 illustratively comprises storage locations that are addressable by the processors and adapters for storing software program code and data used in some embodiments. The processors and adapters may, in turn, comprise processing elements and/or logic circuitry configured to execute the software code and manipulate the data stored in the memory 224. In some embodiments, the memory 224 may comprise a form of random access memory (RAM) comprising "volatile" memory that is generally cleared by a power cycle or other reboot operation.

The storage operating system 300, portions of which is typically resident in memory and executed by the processing elements, functionally organizes the node 200 by, inter alia, invoking storage operations in support of the storage services implemented by the node. It will be apparent to those skilled in the art that other processing and memory means, including various computer readable media, may be used for storing and executing program instructions pertaining to the invention described herein. In some embodiments, the storage operating system 300 comprises a plurality of software layers (including a de-staging layer 370) that are executed by the processors. In some embodiments, the de-staging layer 370 is implemented to produce write logs, produce parity data for write logs, and sub-divide and distribute/transfer copies of the write logs to remote partner nodes.

The local non-volatile storage device 230 may comprise one or more storage devices, such as disks, utilized by the node to locally store configuration information, e.g., provided by one or more management processes. The local non-volatile storage device 230 that may be employed as a backup memory that ensures that the storage system does not "lose" received information, e.g., CIFS and NFS requests, in the event of a system shutdown or other unforeseen problem. In some embodiments, the non-volatile storage device 230 may comprise a rewritable computer memory for storing data that does not require power to maintain data/information stored in the computer memory and may be electrically erased and reprogrammed. Some examples of non-volatile storage devices include flash memory, non-volatile random access memory (NVRAM), Magnetic Random Access Memory (MRAM), Phase Change RAM (PRAM), etc. In other embodiments, other non-volatile storage devices are used other than those listed here.

II. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored.

The virtualization module(s) allow the file system to further logically organize information as a hierarchical structure of blocks on the disks that are exported as named logical unit numbers (luns).

In the illustrative embodiment, the storage operating system is preferably the Data ONTAP® software operating system available from NetApp, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
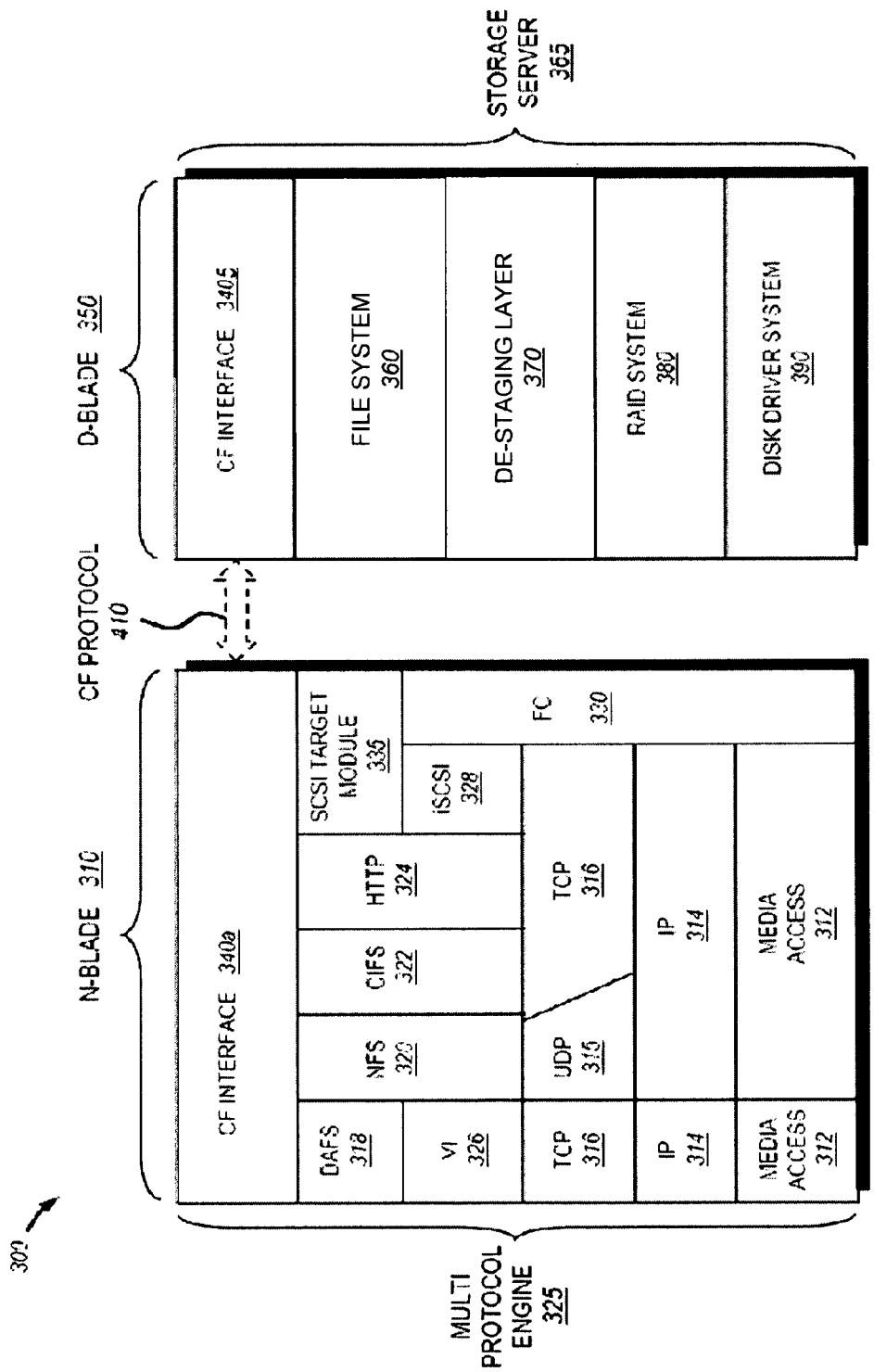
FIG. 3 is a schematic block diagram of an exemplary storage operating system that may be implemented by the node in FIG. 2.

FIG. 3 is a schematic block diagram of an exemplary storage operating system 300 that may be implemented by the node 200 in FIG. 2. The storage operating system 300 comprises a series of software layers organized to form an integrated network protocol stack or, more generally, a multi-protocol engine 325 (N-blade 310) that provides data paths for clients 180 to access data stored on the node 200 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315.

A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 (D-blade 350) that provides data paths for accessing information stored on the disks 130 of the node 200. To that end, the storage server 365 includes a file system module 360, a de-staging layer 370, a storage/RAID system layer 380 and a disk driver system module 390. The RAID system layer 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that allocates storage space for itself in the disk array 120 and controls the layout of information on the array. The file system further provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file (data container) handle, i.e., an identifier that includes an inode number, is used to retrieve an inode from disk.

All inodes of the write-anywhere file system may be organized into the inode file. A file system (fs) info block specifies the layout of information in the file system and includes an inode of a data container, e.g., file, that includes all other inodes of the file system. Each logical volume (file system) has an fsinfo block that may be stored at a fixed or variable location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, an access request (read/write request) from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system produces operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the access request, the node 200 (and storage operating system 300) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system 300 can also be implemented as a microkernel, an application program operating over a general-purpose operating system, such as UNIXO or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In some embodiments, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 340a,b adapted to implement intra-cluster communication among the blades (e.g., communication between blades of the same node or communication between blades of different nodes) using CF protocol messages.

For example, the protocol layers (e.g., the NFS/CIFS layers and the iSCSI/FC layers) of the N-blade 310 may function as protocol servers that translate file-based and block-based access requests from clients 180 into CF protocol messages used for communication with the D-blade 350. In some embodiments, the N-blade servers convert the incoming client access requests into file system primitive operations (commands) that are embedded within CF protocol messages by the CF interface module 340 for transmission to the D-blades 350 of the cluster 100. Notably, the CF interface modules 340 cooperate to provide a single file system image across all D-blades 350 in the cluster 100. Thus, any network port of an N-blade that receives a client request can access any data container within the single file system image located on any D-blade 350 of the cluster.

In some embodiments, the N-blade 310 and D-blade 350 are implemented as separately-scheduled processes of storage operating system 300. In other embodiments, the N-blade 310 and D-blade 350 may be implemented as separate software components/code within a single operating system process. Communication between an N-blade and D-blade in the same node 200 is thus illustratively effected through the use of CF messages passing between the blades. In the case of remote communication between an N-blade and D-blade of different nodes, such CF message passing occurs over the cluster switching fabric 150.

A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc. The SpinFS protocol is described in the above-referenced U.S. Patent Application Publication No. US 2002/0116593.

The CF interface module 340 implements the CF protocol for communicating file system commands/messages among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as (i) a local procedure call (LPC) when communicating a file system command to a D-blade 350 residing on the same node 200 or (ii) a remote procedure call (RPC) when communicating the command to a D-blade residing on a remote node of the cluster 100. In either case, the CF decoder of CF interface 340b on D-blade 350 de-encapsulates the CF message and processes the file system command. As used herein, the term "CF message" may be used generally to refer to LPC and RPC communication between blades of the cluster.

In some embodiments, the storage operating system 300 also comprises a de-staging layer 370 that operates in conjunction with the other software layers and file system of the storage operating system 300 to produce and store write logs as described herein. In some embodiments, the de-staging layer 370 may be pre-included in storage operating system 300 software. In other embodiments, the de-staging layer 370 may comprise an external auxiliary plug-in type software module that works with the storage operating system 300 to enhance its functions. In some embodiments, the de-staging layer 370 may reside between the file system layer 360 and the RAID system layer 380 of the storage operating system 300 (as shown in FIG. 3). In other embodiments, the de-staging layer 370 may reside near other layers of the storage operating system 300.

The de-staging layer 370 may be configured to receive write requests for files and perform the received write requests in two stages. In a first stage, write requests received by the file system layer 360 are sent to the de-staging layer 370, whereby a write request may contain blocks of data to be written. The de-staging layer 370 produces a write log for each received write request, a write log representing the write request and containing the blocks of data to be written. The write logs may be stored to a volatile memory device. As used herein, a primary node produces "local write logs" 280 that may be stored locally to a volatile memory device, for example, to the memory 224 (as shown in FIG. 2).

In a second stage, upon occurrence of a predetermined initiating event (referred to as a "consistency point"), accumulated local write logs 280 stored in the local volatile memory device may be performed on the storage devices (e.g., whereby the received blocks of data are written to the storage devices). To do so, the accumulated local write logs 280 may be sent to the RAID system layer 380 that then performs the write logs (e.g., by writing the blocks of data in the write logs to a storage device). The consistency point may be initiated by various predetermined initiating events such as the occurrence of a predetermined time interval, the storage size of the accumulated local write logs 280 reaching a predetermined threshold size, etc. Note that the consistency point may be initiated at different times for each node in the cluster.

In some embodiments, the de-staging layer 370 may further process the write logs accumulated during the first stage that are awaiting the next consistency point to be written to a storage device 130 during the second stage. In some embodiments, the de-staging layer 370 may process the accumulated write logs 280 (stored locally to a volatile memory device) to produce and store parity data of the write logs 280. As used herein, a primary node produces "local parity data" 285 of the local write logs 280 and stores the "local parity data" 285 to a local non-volatile storage device 230 (as shown in FIG. 2). In some embodiments, the de-staging layer 370 also subdivides the accumulated write logs 280 into two or more sub-sets of write logs and distributes (transfers) the sub-sets to two or more remote partner nodes (each remote partner node storing the received allotted sub-set to a non-volatile storage 230). As used herein, a primary node receives "remote write logs" 290 from two or more remote partner nodes and stores the remote write logs 290 to a local non-volatile storage device 230 (as shown in FIG. 2).

After the second stage is initiated at the consistency point, after a write log is performed on a storage device, the write log is committed to disk and thus may be deleted. As such, after the accumulated local write logs 280 are performed at the consistency point, the local write logs 280 may then be deleted from volatile memory 224. The local parity data 285 produced for the local write logs 280 may also be deleted from non-volatile storage 230. Also, the local write logs 280 distributed/transferred to the two or more remote partner nodes (and stored as remote write logs 290) may also be deleted from the non-volatile storages 230 of the remote partner nodes. After the consistency point, the process repeats as new write logs are produced for new received write requests, the new write logs being processed by the de-staging layer 370.

The de-staging layers 370 in the nodes 200 of the cluster 100 may be configured to communicate and operate in conjunction with each other to perform the methods described herein. As used herein, a local/primary node may comprise a "local" de-staging layer 370 and a remote/partner node may comprise a "remote" de-staging layer 370. The de-staging layers of the various nodes 200 may issue CF messages (via the cluster switching fabric 150) or other commands to each other to transfer/send write logs from one node to another or to delete write logs stored on a remote node (after the write logs are performed and no longer needed). The de-staging layers of the various nodes 200 may also transfer the actual write logs from one node to another via the cluster switching fabric 150.

For example, for sending write logs, the de-staging layer 370 on a primary node may send a CF message to the de-staging layer 370 on a remote partner node to prepare to receive write logs. The de-staging layer 370 on the primary node may then begin sending the write logs to the de-staging layer 370 on the remote partner node through the cluster switching fabric 150. The de-staging layer 370 on the remote partner node may then receive and store the write logs to its local non-volatile storage device 230. For example, for deleting write logs of the primary node (after the write logs have been performed by the primary node), the de-staging layer 370 on the primary node may send a CF message to the de-staging layer 370 on a remote partner node to delete particular write logs that have been performed. The de-staging layer 370 on the remote partner node may then delete the particular write logs from its local non-volatile storage device 230.

III. Shared Storage

As discussed above, in relation to FIGS. 1A-B, the totality of storage space provided by the disks 130 and disk arrays 120 of the cluster 100 comprise a total shared storage space (referred to as "shared storage 135") of the cluster 100. The shared storage 135 is accessible by each D-blade 350 of each node 200 in the cluster 100. Referring to FIG. 1B, for illustrative purposes, node A may be referred to as the local/primary node that may experience a failure, primary node A having two or more remote partner nodes (such as remote partner nodes B, C, and D) that are configured to assume the workload of the primary node A upon failure.

Figure 4:
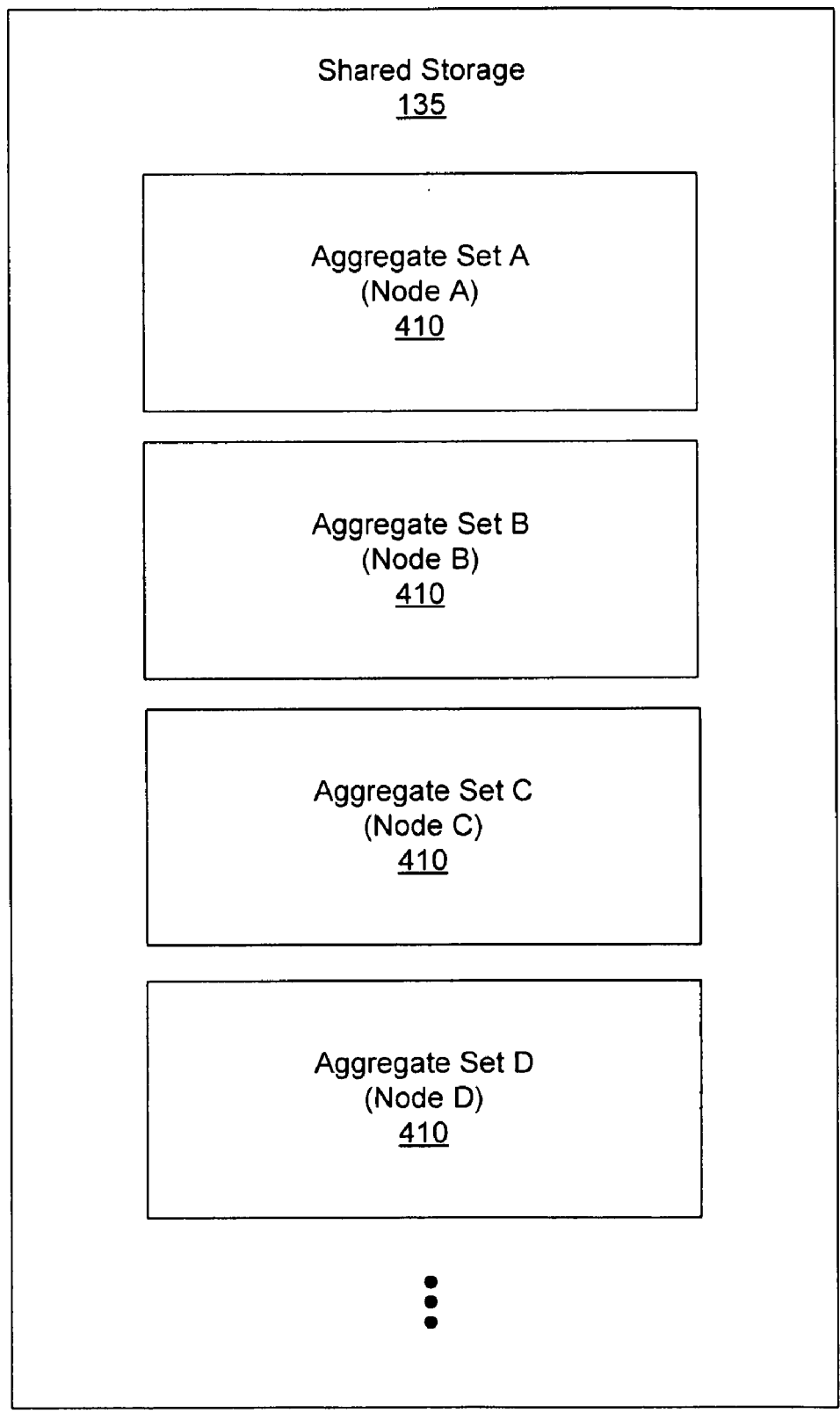
FIG. 4 shows a conceptual diagram of an exemplary shared storage comprising a plurality of aggregates.

FIG. 4 shows a conceptual diagram of an exemplary shared storage 135 of the cluster environment 100 of FIG. 1B. As shown in FIG. 4, the exemplary shared storage 135 comprises a plurality of aggregates, each aggregate comprising a sub-portion of the total available storage space of the shared storage 135. In these embodiments, each node 200 of the cluster 100 is assigned/associated with a set of one or more aggregates 410 in the shared storage 135. For example, node A may be assigned/associated with "Aggregate Set A," node B may be assigned/associated with "Aggregate Set B," etc. Each aggregate set may be used for serving and storing client data for the associated node 200.

In normal operation (when node failures have not occurred), each node 200 may be configured to access only the aggregate set associated/assigned to the node 200. In particular, in normal operation, the D-blade 350 of each node 200 may be configured to access only the aggregate set assigned to the node 200. For example, in normal operation, the D-blade 350 of node A may be configured to access and serve data from only aggregate set A and the D-blade 350 of node B may be configured to access and serve data from only aggregate set B. Therefore, in normal operation, all access requests (received at any N-blade 310 of any node 200 in the cluster) for data in aggregate set A are routed through the D-blade 350 of node A (and have physical addresses/file handles that specify the D-blade 350 of node A). Note that the N-blade 310 of each node can receive access requests for data in any aggregate 410 of the shared storage 135, and will route the access requests to the appropriate D-blade 350 that services the requested data.

In the event of a node failure, the failed node is no longer capable of processing access requests (read/write requests) from clients 180 for data in the aggregate set assigned to the failed node. In such an event, the access requests sent to the failed node 200 may be re-directed to the two or more remote partner nodes 200 for processing. The remote partner nodes 200 of the failed node may be configured to collectively replace the failed node by accessing and serving data in the aggregate assigned to the failed node (as well as the accessing and serving data in its own assigned aggregate). For example, upon failure of primary node A, remote partner nodes B, C, and D may each be configured to access and serve data stored in aggregate set A (whereas under normal operating conditions, the remote partner nodes B, C, and D would not have access to or serve data from aggregate set A).

Figure 5:
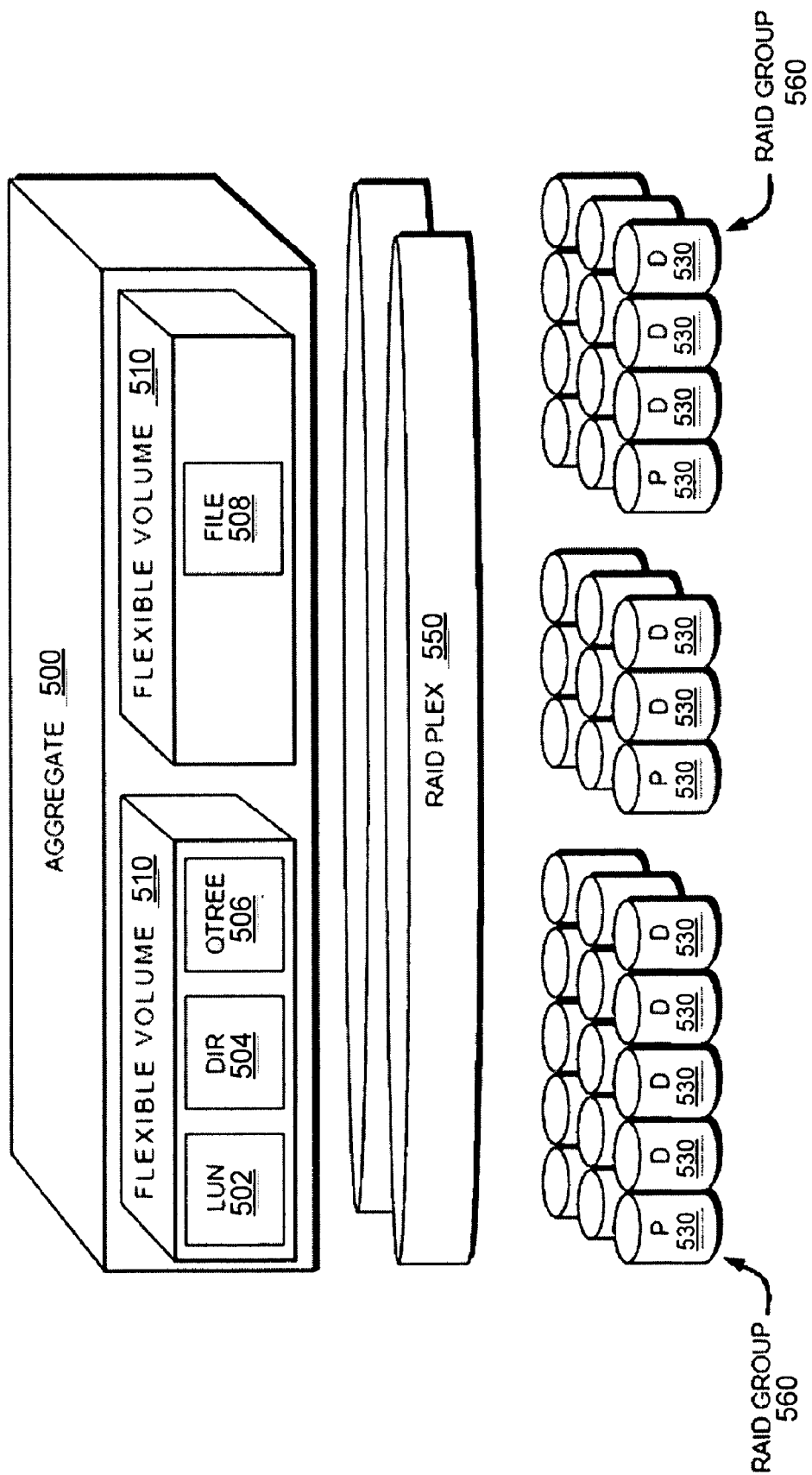
FIG. 5 is a schematic block diagram of an embodiment of an aggregate.

FIG. 5 is a schematic block diagram of an embodiment of an aggregate 500 that may be used in some embodiments. The total storage space of an aggregate 500 may be allocated among a set of one or more flexible volumes 510. A flexible volume 510 may be dynamically increased or decreased in storage size within the total storage space of the aggregate 500. Each flexible volume 510 may comprise one or more data containers, such as, Luns (blocks) 502, directories 504, qtrees 506, files 508, etc. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and at least one (P) parity disk.

IV. Processing and Distributing Write Logs

As discussed above, during a first stage, each node 200 may produce write logs for received write requests and locally store the write logs to a volatile memory device. During a second stage at a consistency point, accumulated write logs stored in the local volatile memory device may be performed on the storage devices. To ensure data consistency in case the write logs in the volatile memory are lost (before the write logs can be performed) and/or the node fails, the write logs may also be stored to non-volatile storage devices. For example, the write logs of the node may be locally stored to a non-volatile memory device and also be stored remotely to a non-volatile storage device at the partner node. As such, if the local/primary node fails, the remote/partner node will have a copy of the write logs and will still be able to perform the write logs on the storage devices. Also, if the write logs stored at the partner node is corrupted or lost, the write logs stored locally in the non-volatile storage device at the primary node can be extracted/retrieved and used to perform the write logs on the storage devices.

A. Mirroring Write Logs in Failover Partners

Figure 6:
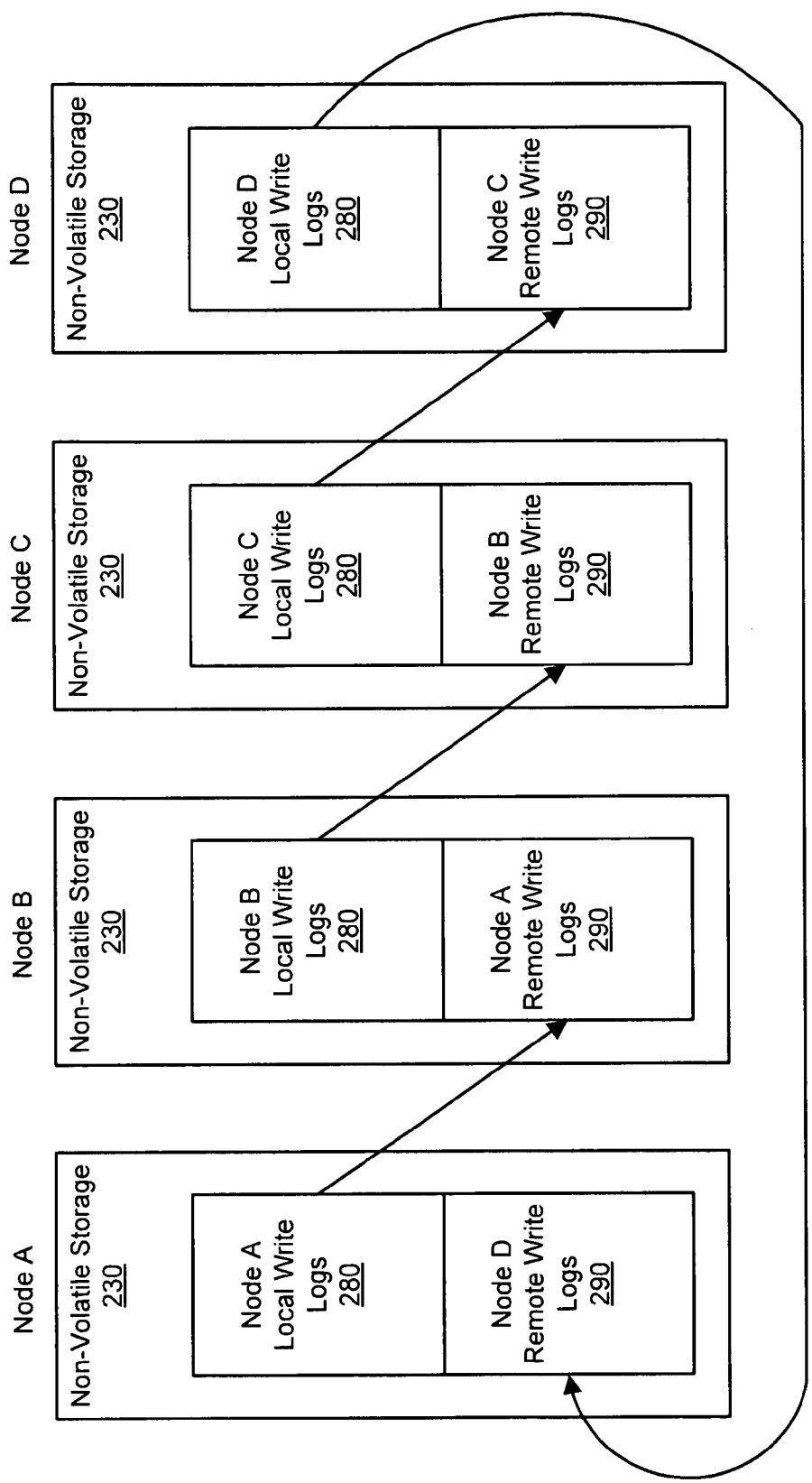
FIG. 6 shows a conceptual diagram of mirroring of write logs for partner nodes.

FIG. 6 shows a conceptual diagram of mirroring of write logs for partner nodes. As shown in the example of FIG. 6, each node 200 stores its own local write logs 280 (i.e., write logs produced by the node) to a local non-volatile storage device 230. Using a simple mirroring scheme, one remote partner node may be assigned to also store (to a non-volatile storage device 230) the write logs of another particular node. As such, each node 200 may also store remote write logs 290 received from a particular partner node to its local non-volatile storage device 230. In the example of FIG. 6, node B may be assigned to store the write logs of node A, node C may be assigned to store the write logs of node B, and so forth.

However, there are two disadvantages of the mirroring scheme. First, upon failure of the primary node, the partner node assigned to store the write logs of the primary node may sub-divide and distribute the write logs to the other partner nodes, whereby each partner node then performs its allotted write logs on the storage devices. However, the sub-dividing and distribution of the write logs after failure of the primary node increases the response time of the cluster to the failure of the primary node. Second, the non-volatile storage space, within the cluster, required to store the write logs of one node is equal to 2*logspace (where logspace equals the storage size of the write logs of the one node). As such, the mirroring scheme for storing write logs may consume a significant amount of valuable non-volatile storage space within the cluster.

In some embodiments, the de-staging layer 375 of each node is implemented to process write logs stored in volatile memory 224 that are accumulated during the first stage and are awaiting the next consistency point to be written to a storage device 130 during the second stage.

B. Producing and Storing Parity Data for Write Logs

Figure 7:
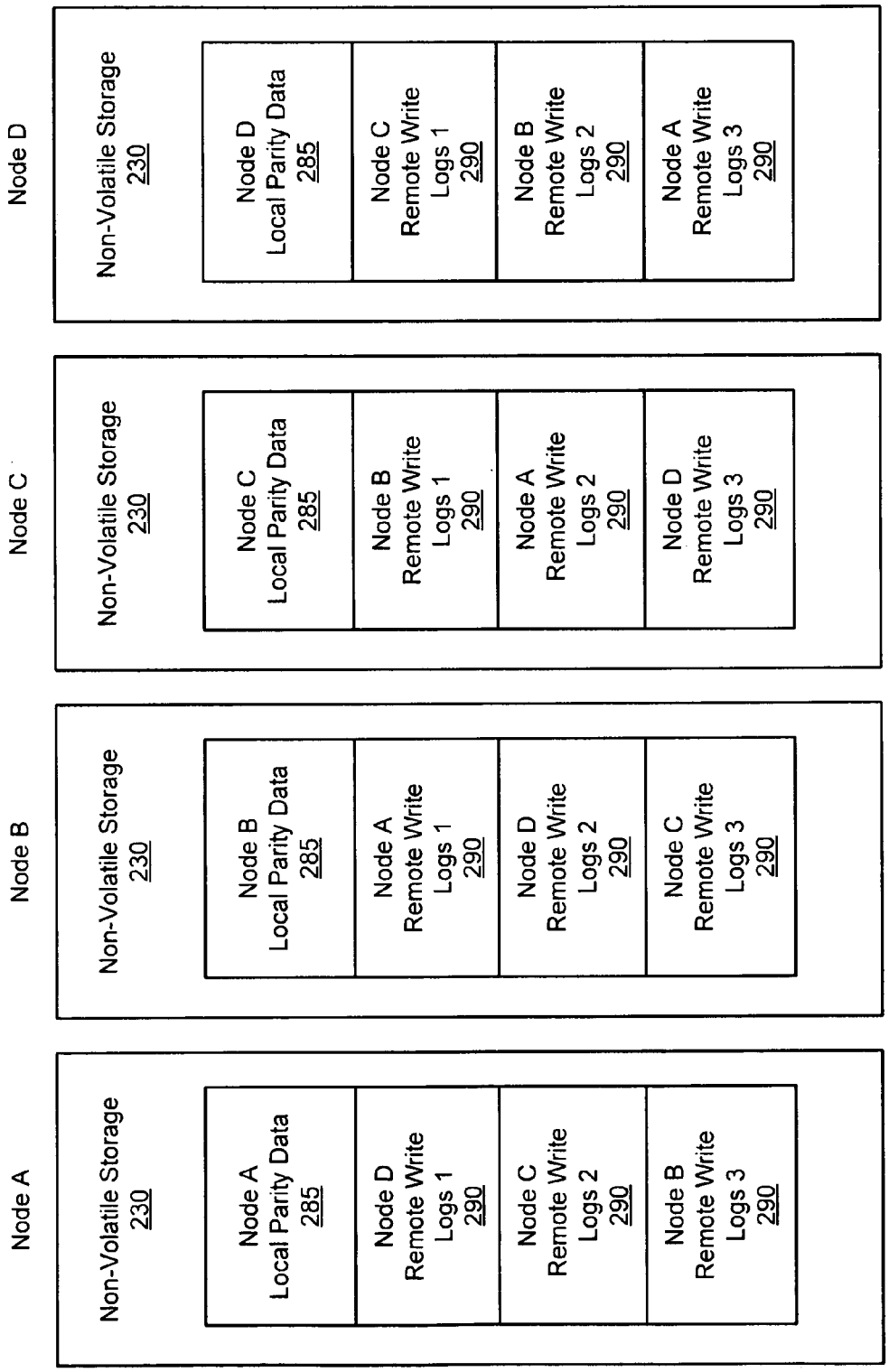
FIG. 7 shows a conceptual diagram of local parity data and sub-divided and distributed remote write logs.

In some embodiments, after the first stage and prior to the second stage, the de-staging layer 375 may process write logs (stored in local volatile memory 224) to produce parity data for the write logs. The primary node may then store the parity data 285 locally to a non-volatile storage device 230 (as shown in FIG. 2). FIG. 7 shows a conceptual diagram of parity data 285 that is produced and stored locally (in non-volatile storage device 230) for each node of a cluster. For example, node A may process local write logs to produce and locally store parity data 285 ("Node A Local Parity Data") for its own write logs.

By storing only a parity image (parity data) of the write logs to the non-volatile storage device (rather than a full copy of the write logs), the non-volatile storage space used for storing the write logs may be reduced throughout the cluster. In these embodiments, a primary node may produce parity data using any parity scheme known in the art, e.g., single parity, double parity, etc. The amount of storage space saved and data protection may vary depending on the parity scheme used. For example, single parity may provide substantial storage savings with some data protection, whereas double parity may provide less storage savings but increased data protection.

For example, if a non-volatile storage size of 2*logspace is required to store, within the cluster, write logs of a primary node using the mirroring scheme, using single parity may require a non-volatile storage size of:

$$[1+(1/(m))]*\text{logspace}$$

whereby m is equal to the number of partner nodes of the primary node. Using double parity may require a non-volatile storage size of:

$$[1+(2/(m))]*\text{logspace}$$

For example, primary node A has three partner nodes B, C, and D and the write logs of node A have a storage size of 3 GB, the mirroring scheme would require 6 GB of non-volatile storage space within the cluster to store the write logs of node A. Using single parity, however, only 4 GB of non-volatile storage space would be needed within the cluster to store the write logs of node A, thus producing a 33% savings of non-volatile storage space within the cluster. Using double parity, only 5 GB of non-volatile storage space would be needed within the cluster to store the write logs of node A, whereby double parity provides less storage savings but increased data protection over single parity.

C. Sub-Dividing and Distributing Write Logs

In some embodiments, after the first stage and prior to the second stage, the de-staging layer 375 may also process write logs (stored in local volatile memory 224) of a primary node by sub-dividing the accumulated write logs 280 into two or more sub-sets of write logs. The de-staging layer 375 may then distribute/transfer copies of the sub-sets of write logs of the primary node to two or more remote partner nodes. Each remote partner node may receive a sub-set of write logs and store the received sub-set locally to a non-volatile storage 230. Upon failure of the primary node, each remote partner node may perform the received sub-set of write logs on the storage devices of the shared storage 135. In some embodiments, the local write logs of a node may be sub-divided and distributed after parity data of the local write logs is produced.

FIG. 7 shows a conceptual diagram of write logs that are sub-divided and distributed to two or more remote partner nodes. For example, for node A, the de-staging layer 375 may store its local write logs 280 to local volatile memory 224 and sub-divide the local write logs 280 into three sub-sets of write logs. The de-staging layer 375 of node A may then distribute/transfer a copy of a first sub-set of write logs to remote partner node B, whereby the de-staging layer 375 of node B receives and stores the first sub-set locally to a non-volatile storage

230 (as "Node A Remote Write Logs 1" 290). Likewise, node A transfers a copy of a second sub-set of write logs to remote partner node C which locally stores the second sub-set (as "Node A Remote Write Logs 2" 290) and transfers a copy of a third sub-set of write logs to remote partner node D which locally stores the third sub-set (as "Node A Remote Write Logs 3" 290). The local write logs 280 of nodes B, C, and D may be similarly sub-divided and distributed (as shown in the example of FIG. 7).

As such, the local write logs of a primary node may be striped/sub-divided and distributed to two or more partner nodes prior to failure of the primary node (e.g., upon the write logs being produced by the primary node) for storage at non-volatile storage devices at the partner nodes. Thus, upon failure of the primary node, each partner node will already have stored locally a sub-set of its allotted write logs to perform on the storage devices of the shared storage 135. This avoids having a single partner node sub-divide and re-distribute the write logs to the other partner nodes after failure of the primary node, which improves the response time of the cluster to the failure of the primary node.

In some embodiments, the local write logs 280 of a primary node may be sub-divided and distributed to remote partner nodes in a variety of ways (e.g., based on storage size, number of write logs, time periods, etc.). For example, in some embodiments, the local write logs may be sub-divided into two or more sub-sets, each sub-set having approximately the same predetermined storage size so that each remote partner node receives an allotted sub-set that is approximately equal in storage size. For example, a first sub-set comprising approximately 50 MB of write logs may be distributed to a first remote partner node, a second sub-set comprising approximately 50 MB of write logs may be distributed to a second remote partner node, etc. In other embodiments, the local write logs may be sub-divided into two or more sub-sets, each sub-set having approximately the same number of write logs. In further embodiments, the local write logs may be sub-divided into two or more sub-sets, each sub-set having write logs produced during a predetermined time interval. For example, a first sub-set comprising write logs produced during a first day may be distributed to a first remote partner node, a second sub-set comprising write logs produced during a second day may be distributed to a second remote partner node, etc.

As discussed above in Section III, a primary node 200 of the cluster 100 is assigned/associated with a set of one or more aggregates 410 in the shared storage 135 to which the primary node stores and serves client data. Write requests received by nodes of the cluster may comprise a block/data address that specifies a particular aggregate 410 on which the write request is to be performed. The data address may be used to route the write request to the appropriate node 200 assigned to store and serve client data for the specified aggregate 410. A write log produced for a write request represents the write request and also contains the data address specifying a particular aggregate on which the write log is to be performed.

In some embodiments, a plurality of aggregates are associated with a primary node, the plurality of aggregates comprising two or more sub-sets of aggregates. In these embodiments, the local write logs of the primary node may be sub-divided into two or more sub-sets of write logs, each sub-set of write logs comprising write logs to be performed on the predetermined sub-set of aggregates associated with the primary node, wherein each write log in the sub-set of write logs specifies an aggregate in the predetermined sub-set of aggregates. In some embodiments, in the event of a failure of the primary node, each remote partner node of the primary node may be assigned to access and serve data of a predetermined sub-set of aggregates associated with the primary node. Each remote partner node may receive a sub-set of write logs of the primary node that specify the predetermined sub-set of aggregates assigned to the remote partner node upon failure of the primary node.

To illustrate, in the example of FIG. 7, primary node A may be associated with "Aggregate Set A" comprising aggregates 1-9. In the event of a failure of primary node A, remote partner node B may be assigned to access and serve data of the sub-set of aggregates 1-3, remote partner node C may be assigned to access and serve data of the sub-set of aggregates 4-6, and remote partner node D may be assigned to access and serve data of the sub-set of aggregates 7-9. The local write logs of primary node A may be sub-divided into three sub-sets of write logs, a first sub-set comprising write logs to be performed on aggregates 1-3, a second sub-set comprising write logs to be performed on aggregates 4-6, and a third sub-set comprising write logs to be performed on aggregates 7-9. The three sub-sets of write logs are then distributed whereby node B receives and stores the first sub-set, node C receives and stores the second sub-set, and node D receives and stores the third sub-set. As such, if node A fails, node B may perform the first sub-set of write logs on the sub-set of aggregates 1-3, node C may perform the second sub-set of write logs on the sub-set of aggregates 4-6, and node D may perform the third sub-set of write logs on the sub-set of aggregates 7-9.

D. Reconstructing Corrupted or Lost Write Logs

As discussed above, the de-staging layers 375 of the nodes 200 produce parity data for write logs of a primary node and distribute copies of the write logs to two or more remote partner nodes prior to any failure of the primary node. If the primary node fails, then each remote partner node is configured to perform the received write logs of the primary node (which are stored locally to non-volatile storage 230) on the shared storage 135. However, while performing its received write logs, a particular partner node may determine that the data of the write logs is corrupt or lost. If so, the particular partner node may retrieve the parity data at the primary node (stored in a non-volatile storage device) and the valid data of the other write logs stored at the one or more other remote partner nodes (which do not have corrupted or lost write logs). The particular partner node may then reconstruct the corrupt or lost write logs (using methods well known in the art) from the retrieved parity data and the retrieved valid write logs. After reconstruction of the corrupt or lost write logs, the particular remote partner node may then perform the reconstructed write logs on the shared storage 135.

For example, the de-staging layer 375 of primary node A may produce parity data for a first write log and a second write log(stored in local volatile memory 224). For example, the parity data may be produced by performing an exclusive OR logical operation (XOR) on the data of the first and second write logs (for simple parity). A copy of the first write log may be transferred and stored to remote node B and a copy of the second write log may be transferred and stored to remote node C. If the first write log becomes corrupt or lost, the parity data and the second write log may be retrieved to reconstruct the first write log. For example, the first write log may be reconstructed by using the XOR logical operation (for simple parity).

E. Method for Processing and Distributing Write Logs

Figure 8:
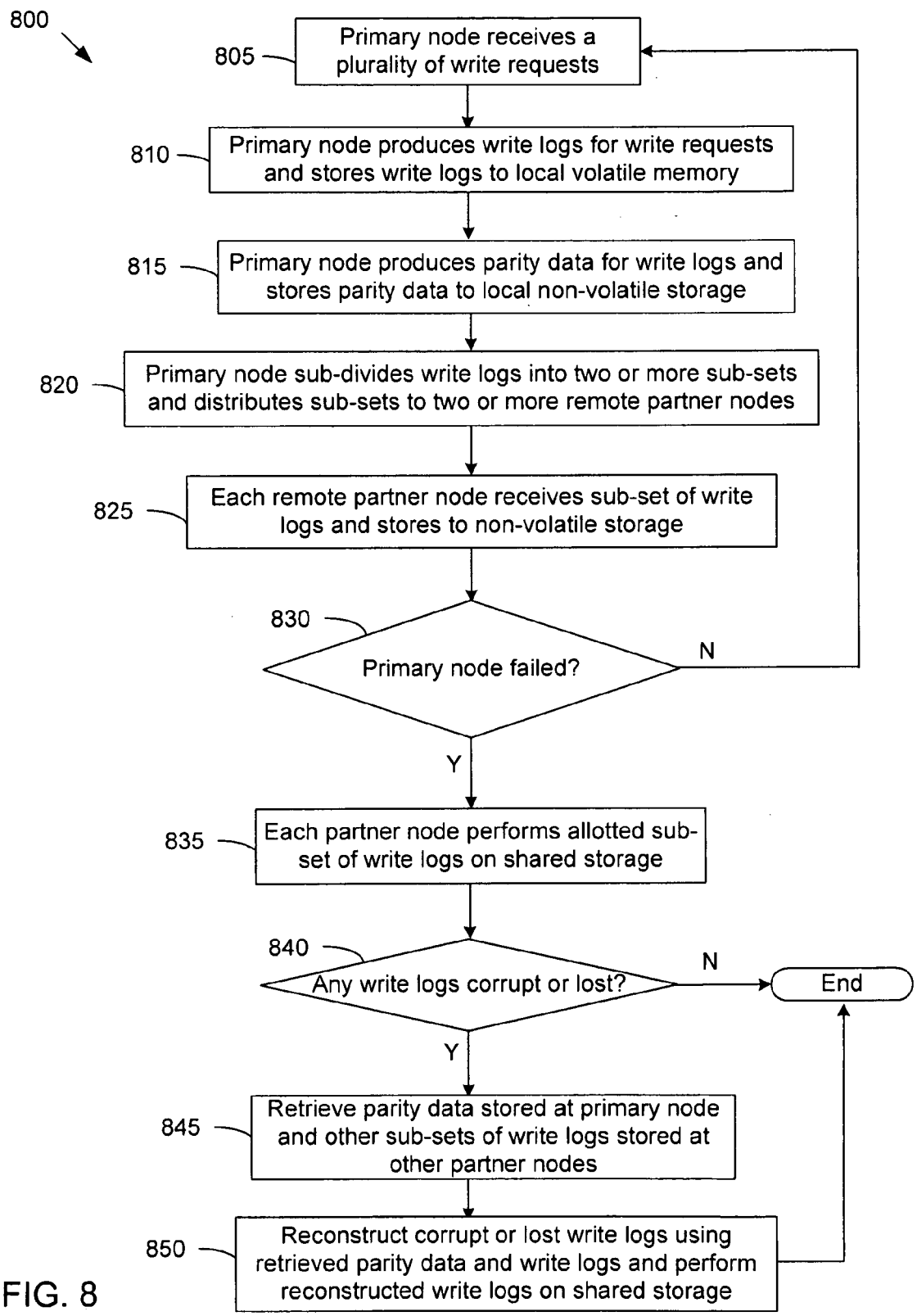
FIG. 8 is a flowchart of a method for processing and distributing write logs of nodes of a cluster.

FIG. 8 is a flowchart of a method 800 for processing and distributing write logs of nodes 200 of a cluster 100. In some embodiments, some of the steps of the method 800 are implemented by software or hardware. In some embodiments, some of the steps of method 800 are performed by de-staging layers 370 residing on the operating system of the nodes 200. The order and number of steps of the method 800 are for illustrative purposes only and, in other embodiments, a different order and/or number of steps are used.

The method 800 begins when a primary node 200 receives (at step 805) a plurality of write requests. The primary node 200 produces (at step 810) a plurality of write logs for the write requests, and stores the write logs to a local volatile memory 224 ("Local Write Logs" 280 shown in FIG. 2). The primary node 200 then produces (at step 815) parity data for the plurality of write logs and stores the parity data to a local non-volatile storage 230 ("Local Parity Data" 285 shown in FIG. 2). The primary node 200 sub-divides (at step 820) the plurality of write logs into two or more sub-sets of write logs and distributes the sub-sets of write logs to two or more remote partner nodes. Each remote partner node receives (at step 825) a sub-set of write logs and stores the received sub-set to a non-volatile storage 230 ("Remote Write Logs" 290 shown in FIG. 2).

The method 800 then determines (at step 830) whether the primary node has failed. If not, the method continues at step 805. If so, each of the two or more remote partner nodes performs (at step 835) its allotted sub-set of write logs (stored to a non-volatile storage 230) on the storage devices of the shared storage 135. The method 800 then determines (at step 840) whether any sub-set of write logs allotted to any partner node is corrupt or lost. If not, the method 800 ends. If so, the method 800 retrieves (at step 845) the parity data stored at the primary node (in a non-volatile storage device) and the other sub-sets of write logs stored at the one or more other partner nodes (which do not have corrupted or lost write logs). The method then reconstructs (at step 850) the corrupt or lost write logs (using methods well known in the art) from the retrieved parity data and write logs and performs the reconstructed write logs on the shared storage. The method 800 then ends.

Some embodiments may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art.

Some embodiments include a computer program product comprising a computer readable medium (media) having instructions stored thereon/in when executed (e.g., by a processor) perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism utilizing the results of an embodiment. Such software may include without limitation device drivers, operating systems, and user applications. Ultimately, such computer readable media further includes software instructions for performing embodiments described herein. Included in the programming (software) of the general/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, a software module or software layer may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A cluster storage system for providing clients access to data of a shared storage, the cluster storage system comprising:
    the shared storage comprising a plurality of aggregates, each aggregate comprising a predetermined set of storage devices for storing data of the aggregate;
    a plurality of nodes, each node assigned to service data of a predetermined plurality of aggregates in the shared storage, wherein during normal operation when no node failure has occurred, each node can access only the aggregates assigned to the node, the plurality of nodes comprising a primary node and a plurality of partner nodes comprising a first partner node and a second partner node;
    the primary node assigned to service data of a first aggregate and a second aggregate, the primary node comprising a local de-staging layer configured for:
        producing a plurality of write logs for a plurality of received write requests for the first and second aggregates;
        producing parity data for the plurality of write logs;
        storing the parity data to local non-volatile storage, wherein the plurality of write logs are not stored to local non-volatile storage;
        dividing the plurality of write logs on a per aggregate basis, wherein the plurality of write logs is divided into a first set of write logs for the first aggregate and a second set of write logs for the second aggregate; and
        distributing the first set of write logs only to the first partner node and the second set of write logs only to the second partner node;
    the first partner node comprising a first remote de-staging layer configured for:
        receiving the first set of write logs for the first aggregate; and
        performing the first set of write logs on the first aggregate upon failure of the primary node, wherein the first partner node is the only partner node performing write logs on the first aggregate upon failure of the primary node; and
    the second partner node comprising a second remote de-staging layer configured for:
        receiving the second set of write logs for the second aggregate; and
        performing the second set of write logs on the second aggregate upon failure of the primary node, wherein the second partner node is the only partner node performing write logs on the second aggregate upon failure of the primary node.

2. The cluster storage system of claim 1, wherein each partner node is configured for resuming the data-access service of the primary node upon failure of the primary node.

3. The cluster storage system of claim 1, wherein each remote de-staging layer is further configured for:
    storing the received write logs to local non-volatile storage, wherein the write logs are received and stored prior to failure of the primary node.

4. The cluster storage system of claim 1, wherein the local non-volatile storage comprises write logs received from the plurality of partner nodes.

5. The cluster storage system of claim 1, wherein each remote de-staging layer is further configured for:
    upon failure of the primary node, reconstructing corrupt or lost write logs in the received write logs using the parity data; and
    performing the reconstructed write logs on the shared storage.

6. The cluster storage system of claim 1, wherein the parity data is not distributed from the primary node to any partner nodes.

7. A method for implementing a cluster storage system for providing clients access to data of a shared storage, the method comprising:
    storing data to the shared storage, the shared storage comprising a plurality of aggregates, each aggregate comprising a predetermined set of storage devices for storing data of the aggregate;
    providing a plurality of nodes, each node assigned to service data of a predetermined plurality of aggregates in the shared storage, wherein during normal operation when no node failure has occurred, each node can access only the aggregates assigned to the node, the plurality of nodes comprising a primary node and a plurality of partner nodes comprising a first partner node and a second partner node;
    assigning the primary node to service data of a first aggregate and a second aggregate;
    at the primary node:
        producing a plurality of write logs for a plurality of received write requests for the first and second aggregates;
        producing parity data for the plurality of write logs;
        storing the parity data to local non-volatile storage, wherein the plurality of write logs are not stored to local non-volatile storage;
        dividing the plurality of write logs on a per aggregate basis, wherein the plurality of write logs is divided into a first set of write logs for the first aggregate and a second set of write logs for the second aggregate; and
        distributing the first set of write logs only to the first partner node and the second set of write logs only to the second partner node;
    at the first partner node:
        receiving the first set of write logs for the first aggregate; and
        performing the first set of write logs on the first aggregate upon failure of the primary node, wherein the first partner node is the only partner node performing write logs on the first aggregate upon failure of the primary node; and
    at the second partner node:
        receiving the second set of write logs for the second aggregate; and
        performing the second set of write logs on the second aggregate upon failure of the primary node, wherein the second partner node is the only partner node performing write logs on the second aggregate upon failure of the primary node.

8. The method of claim 7, wherein each partner node is configured for resuming the data-access service of the primary node upon failure of the primary node.

9. The method of claim 7, further comprising:
at each partner node, storing the received write logs to local non-volatile storage, wherein the write logs are received and stored prior to failure of the primary node.

10. The method of claim 7, further comprising:
at each partner node, upon failure of the primary node, reconstructing corrupt or lost write logs in the received write logs using the parity data; and
at each partner node, performing the reconstructed write logs on the shared storage.

11. The method of claim 7, wherein the parity data is not distributed from the primary node to any partner nodes.

12. A non-transitory computer readable medium having instructions stored thereon when executed, implement a cluster storage system for providing clients access to data of a shared storage, the computer readable medium comprising sets of instructions for:
storing data to the shared storage, the shared storage comprising a plurality of aggregates, each aggregate comprising a predetermined set of storage devices for storing data of the aggregate;
providing a plurality of nodes, each node assigned to service data of a predetermined plurality of aggregates in the shared storage, wherein during normal operation when no node failure has occurred, each node can access only the aggregates assigned to the node, the plurality of nodes comprising a primary node and a plurality of partner nodes comprising a first partner node and a second partner node;
assigning the primary node to service data of a first aggregate and a second aggregate;
at the primary node:
producing a plurality of write logs for a plurality of received write requests for the first and second aggregates;
producing parity data for the plurality of write logs;
storing the parity data to local non-volatile storage, wherein the plurality of write logs are not stored to local non-volatile storage;
dividing the plurality of write logs on a per aggregate basis, wherein the plurality of write logs is divided into a first set of write logs for the first aggregate and a second set of write logs for the second aggregate; and
distributing the first set of write logs only to the first partner node and the second set of write logs only to the second partner node;
at the first partner node:
receiving the first set of write logs for the first aggregate; and
performing the first set of write logs on the first aggregate upon failure of the primary node, wherein the first partner node is the only partner node performing write logs on the first aggregate upon failure of the primary node; and
at the second partner node:
receiving the second set of write logs for the second aggregate; and
performing the second set of write logs on the second aggregate upon failure of the primary node, wherein the second partner node is the only partner node performing write logs on the second aggregate upon failure of the primary node.

13. The non-transitory computer readable medium of claim 12, wherein each partner node is configured for resuming the data-access service of the primary node upon failure of the primary node.

14. The non-transitory computer readable medium of claim 12, further comprising a set of instructions for:
at each partner node, storing the received write logs to local non-volatile storage, wherein the write logs are received and stored prior to failure of the primary node.

15. The non-transitory computer readable medium of claim 12, further comprising a set of instructions for:
at each partner node, upon failure of the primary node, reconstructing corrupt or lost write logs in the received write logs using the parity data; and
at each partner node, performing the reconstructed write logs on the shared storage.

16. The non-transitory computer readable medium of claim 12, wherein the parity data is not distributed from the primary node to any partner nodes.

* * * * *